United States Patent
Akiyoshi (10) Patent No.: US 12,499,963 B2
(45) Date of Patent: Dec. 16, 2025

(54) SEMICONDUCTOR INTEGRATED CIRCUIT DEVICE WITH A RING OSCILLATOR HAVING A PLURALITY OF STAGES OF DELAY CIRCUITS FOR MEASURING THE DELAY CHARACTERISTIC OF A TRANSISTOR

(71) Applicant: Socionext Inc., Kanagawa (JP)

(72) Inventor: Hideo Akiyoshi, Yokohama (JP)

(73) Assignee: Socionext Inc., Kanagawa (JP)

( * ) Notice: Subject to any disclaimer, the term of this patent is extended or adjusted under 35 U.S.C. 154(b) by 121 days.

(21) Appl. No.: 18/584,725

(22) Filed: Feb. 22, 2024

(65) Prior Publication Data
US 2024/0233854 A1    Jul. 11, 2024

Related U.S. Application Data (63) Continuation of application No. PCT/JP2021/031085, filed on Aug. 25, 2021.

(51) Int. Cl.
| | | |
|---|---|---|
| G11C 29/50 | (2006.01) | |
| G11C 11/412 | (2006.01) | |
| H10B 10/00 | (2023.01) | |

(52) U.S. Cl.
CPC ............ *G11C 29/50* (2013.01); *G11C 11/412* (2013.01); *H10B 10/12* (2023.02); *G11C 2029/5002* (2013.01)

(58) Field of Classification Search
CPC . G11C 29/50; G11C 11/412; G11C 29/12015; G11C 29/50012; G11C 2029/50; H10B 10/12
See application file for complete search history.

(56) References Cited

U.S. PATENT DOCUMENTS

| | | | | | |
|---|---|---|---|---|---|
| 5,563,542 | A | * | 10/1996 | Watarai | H03K 19/018571 |
| | | | | | 327/396 |
| 8,004,878 | B2 | * | 8/2011 | Asayama | G11C 29/025 |
| | | | | | 365/205 |

(Continued)

FOREIGN PATENT DOCUMENTS

| | | | | | |
|---|---|---|---|---|---|
| DE | 10046413 | A1 | * | 4/2001 | ............... G11C 8/18 |
| EP | 0704972 | A2 | * | 4/1996 | ..... H03K 19/003661 |

(Continued)

OTHER PUBLICATIONS

Mureddu, et al., "Experimental Study of Locking Phenomena on Oscillating Rings Implemented in Logic Devices"; IEEE Transactions on Circuits and Systems I: Regular Papers, vol. 66, No. 7, pp. 2560-2571, Jul. 2019. (Year: 2019).*

(Continued)

*Primary Examiner* — B. James Peikari
(74) *Attorney, Agent, or Firm* — Rimon P.C.

(57) ABSTRACT

A semiconductor integrated circuit device includes a ring oscillator having a plurality of stages of delay circuits. In each of the delay circuits, when the signal at the input terminal makes a first transition, the signal at the output terminal transitions in response to the operation of a first transistor that corresponds to a transistor in an SRAM cell. When the signal at the input terminal makes a second transition, the first transistor is electrically isolated from the output terminal, and the signal at the output terminal transitions in response to the operation of a second transistor.

8 Claims, 4 Drawing Sheets

(56) References Cited

U.S. PATENT DOCUMENTS

| | | | | |
|---|---|---|---|---|
| 9,160,315 B2* | 10/2015 | Moriwaki | ........ | G11C 29/12015 |
| 9,240,247 B2* | 1/2016 | Tsuruta | ................ | G11C 29/021 |
| 10,964,379 B2* | 3/2021 | Herberholz | ........... | G11C 11/417 |
| 2001/0054921 A1* | 12/2001 | Akiyoshi | ............... | H03K 17/22 |
| | | | | 327/143 |
| 2003/0234671 A1* | 12/2003 | Akiyoshi | ................ | H03K 5/06 |
| | | | | 327/172 |
| 2008/0211556 A1* | 9/2008 | Masuo | ................... | G11C 29/02 |
| | | | | 327/161 |
| 2009/0135662 A1* | 5/2009 | Akiyoshi | ............... | G11C 5/147 |
| | | | | 365/189.09 |
| 2014/0002199 A1 | 1/2014 | Tsuruta | | |
| 2014/0210561 A1 | 7/2014 | Moriwaki | | |

FOREIGN PATENT DOCUMENTS

| | | |
|---|---|---|
| JP | 2014-010874 A | 1/2014 |
| JP | 2014-150353 A | 8/2014 |

OTHER PUBLICATIONS

International Search Report dated Oct. 5, 2021 issued in International Patent Application No. PCT/JP2021/031085, with English translation.

* cited by examiner

SEMICONDUCTOR INTEGRATED CIRCUIT DEVICE WITH A RING OSCILLATOR HAVING A PLURALITY OF STAGES OF DELAY CIRCUITS FOR MEASURING THE DELAY CHARACTERISTIC OF A TRANSISTOR

CROSS-REFERENCE TO RELATED APPLICATIONS

This is a continuation of International Application No. PCT/JP2021/031085 filed on Aug. 25, 2021, which is incorporated by reference herein.

BACKGROUND

The present disclosure relates to a semiconductor integrated circuit device for measuring the delay characteristic of a transistor.

In a semiconductor integrated circuit device equipped with static random access memory (SRAM), for measuring the influence of manufacturing variations in the SRAM, a ring oscillator may be used to measure the delay characteristics of transistors in the SRAM.

Japanese Unexamined Patent Publication No. 2014-10874 discloses a technique in which transistors in an SRAM are incorporated into a delay circuit of a ring oscillator, wherein the oscillating frequency of the ring oscillator may be measured in a manner that allows the rise/fall characteristics of these transistors to be measured independently.

However, such measurements of the delay characteristics of transistors tend to be imprecise. More specifically the path through which a signal passes includes four transistors in one period of the oscillating operation of the ring oscillator, and the target transistor is among the four transistors. Therefore, in the delay operation for oscillation, the proportion of the delay caused by the target transistor is low. In order to increase the delay caused by the target transistor, the load connected to its output may be increased. In this case, however, the loads of the other transistors will also be increased. This will therefore limit any increase in the proportion of the delay caused by the target transistor in the delay operation.

An objective of the present disclosure is to enhance the precision of the delay characteristic measurement of an evaluation-target transistor in a semiconductor integrated circuit device.

SUMMARY

In the present disclosure, a semiconductor integrated circuit device includes: an SRAM circuit block including an SRAM cell; and a ring oscillator having a plurality of stages of delay circuits, wherein each of the delay circuits includes an input terminal, an output terminal, a first transistor of a first conductivity type, corresponding to a transistor in the SRAM cell, having a gate connected to the input terminal and a source connected to a first power supply, a second transistor of a second conductivity type, having a gate connected to the input terminal, a source connected to a second power supply, and a drain connected to the output terminal, and a third transistor of the first conductivity type, having a gate connected to the input terminal, a source connected to a drain of the first transistor, and a drain connected to the output terminal, when a signal sent to the input terminal makes a first transition, the first and third transistors become conductive while the second transistor becomes nonconductive, and with the conduction of the third transistor, the drain of the first transistor is electrically connected to the output terminal, so that a signal at the output terminal transitions in response to an operation of the first transistor, and when the signal sent to the input terminal makes a second transition opposite to the first transition, the first and third transistors become nonconductive while the second transistor becomes conductive, and with the nonconduction of the third transistor, the drain of the first transistor is electrically isolated from the output terminal, so that the signal at the output terminal transitions in response to an operation of the second transistor.

According to the above mode, the semiconductor integrated circuit device includes a ring oscillator having a plurality of stages of delay circuits. In each of the delay circuits, when the signal sent to the input terminal makes a first transition, the signal at the output terminal transitions in response to the operation of the first transistor that corresponds to a transistor in the SRAM cell. When the signal sent to the input terminal makes a second transition, the first transistor corresponding to the transistor in the SRAM cell is electrically isolated from the output terminal, and the signal at the output terminal transitions in response to the operation of the second transistor. Therefore, by increasing the load capacitance connected to the output of the first transistor, the proportion of the delay caused by the first transistor in the oscillation period of the ring oscillator can be increased. This can enhance the measurement precision of the delay characteristic of the first transistor.

According to the semiconductor integrated circuit device of the present disclosure, the precision of the delay characteristic measurement of an evaluation-target transistor can be enhanced.

DETAILED DESCRIPTION

An embodiment of the present disclosure will be described hereinafter with reference to the accompanying drawings. Note that, in the following description, "IN" and "OUT" are used as reference characters representing both a terminal name and a signal name. Note also that a high level and a low level of a signal are simply expressed as "high" and "low", respectively, in some cases.

Figure 1:
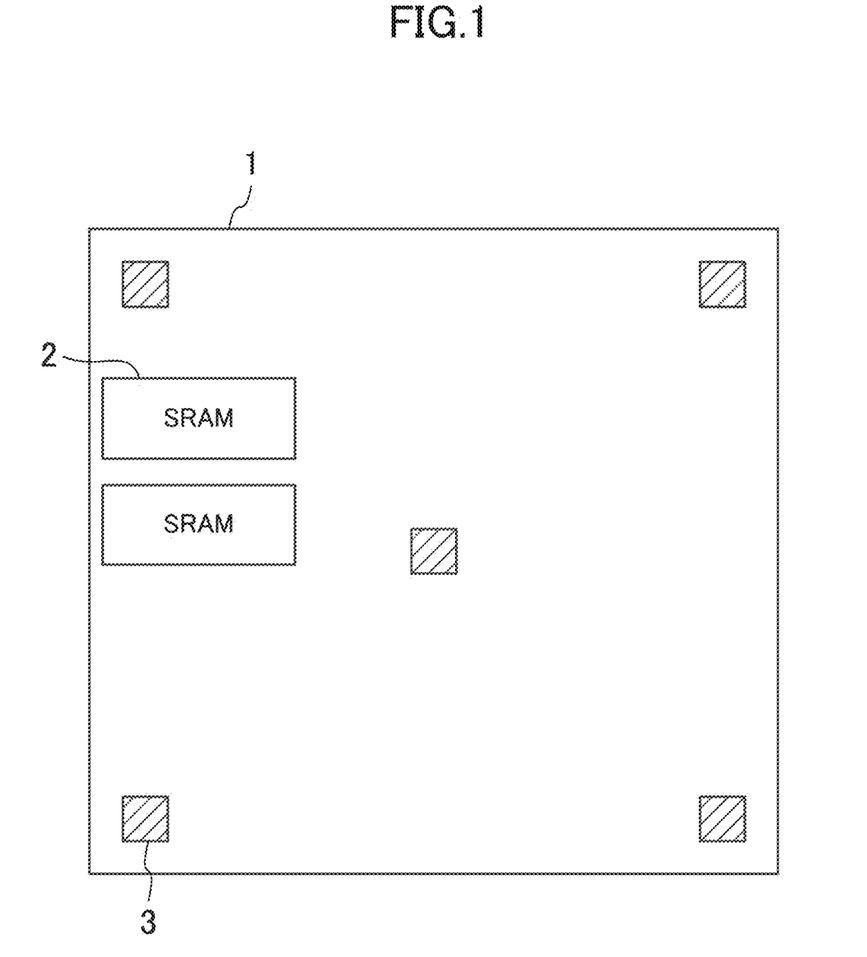
FIG. 1 is a plan view schematically showing the entire configuration of a semiconductor integrated circuit device according to an embodiment.

FIG. 1 is a plan view schematically showing the entire configuration of a semiconductor integrated circuit device according to an embodiment. A semiconductor integrated circuit device 1 of FIG. 1 includes a plurality of static random access memory (SRAM) circuit blocks 2 and a plurality of characteristic measurement circuits 3.

Figure 2:
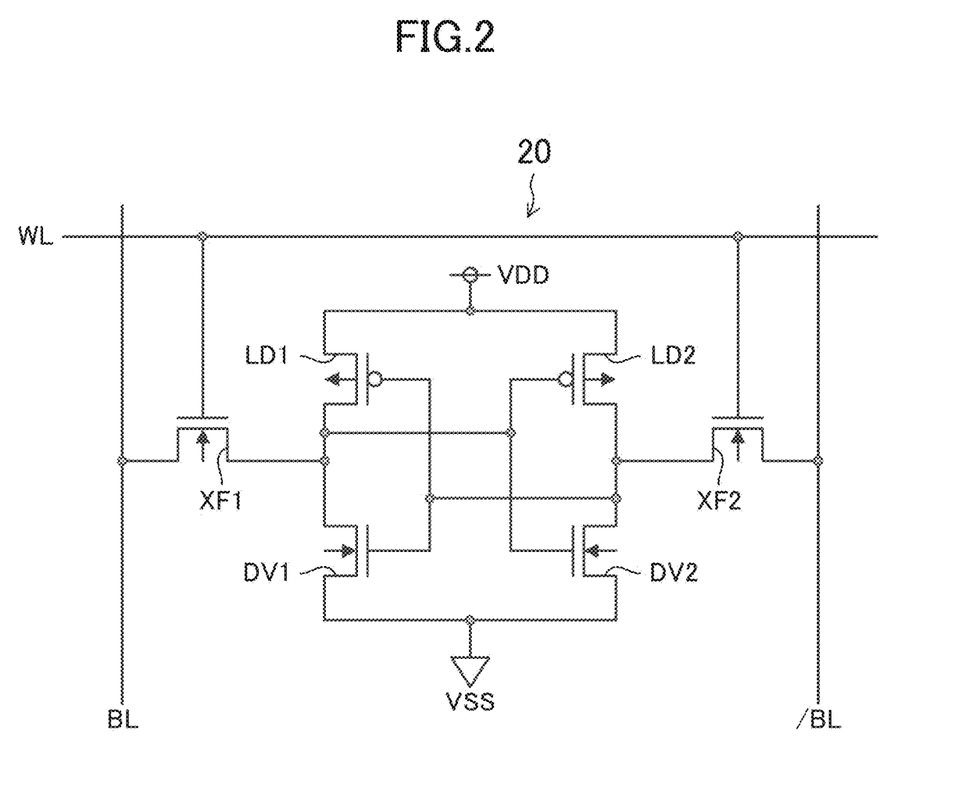
FIG. 2 shows an example of the circuit configuration of an SRAM cell.

FIG. 2 shows an example of the circuit configuration of an SRAM cell. An SRAM cell 20 shown in FIG. 2 includes p-type load transistors LD1 and LD2, n-type drive transistors DV1 and DV2, and n-type access transistors XF1 and XF2. By giving 'high' to a word line WL, data read from a bit line pair BL and /BL and data write into the bit line pair BL and /BL can be performed. Each of the SRAM circuit blocks 2 includes a plurality of SRAM cells 20.

Each of the characteristic measurement circuits 3 includes a ring oscillator to be described later. By measuring the oscillating frequency of the ring oscillator, the delay characteristic of a transistor of the SRAM cell 20 can be measured. Note that, in FIG. 1, a total of five characteristic measurement circuits 3 are placed in the center portion and near the four corners of the semiconductor integrated circuit device 1, the number of characteristic measurement circuits 3 and the positions thereof are not limited to those shown in the figure. With the placement of a plurality of characteristic measurement circuits 3, it is possible to measure on-chip variations in the delay characteristic of transistors.

Figure 3:
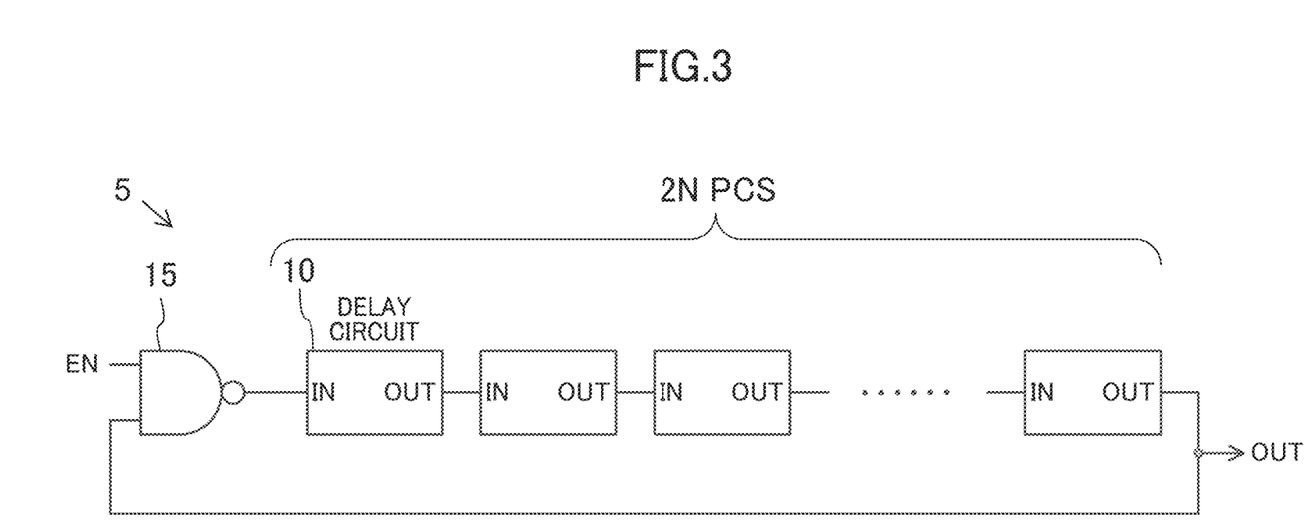
FIG. 3 shows a configuration example of a ring oscillator.

FIG. 3 shows a configuration example of the ring oscillator included in the characteristics measurement circuit. A ring oscillator 5 shown in FIG. 3 includes 2N (N is a natural number) serially-connected delay circuits 10 and a NAND circuit 15. N is 100 or more, for example. The delay circuits 10 each invert the logic of a signal. The NAND circuit 15 receives, at its inputs, an enable signal EN and the output OUT of the final-stage delay circuit 10. The output of the NAND circuit 15 is sent to the input IN of the first-stage delay circuit 10. The output signal OUT of the final-stage delay circuit 10 is output as the output signal OUT of the ring oscillator 5.

When the enable signal EN is low, the output of the NAND circuit 15 becomes high. The outputs OUT of the delay circuits 10 become low and high alternately, resulting in the output signal OUT of the ring oscillator 5 becoming high. By making the enable signal high, the ring oscillator 5 starts its oscillating operation, and outputs an oscillation signal as the output signal OUT. By measuring the oscillating frequency of the output signal OUT, the delay characteristic of transistors can be measured.

First Example

Figure 4:
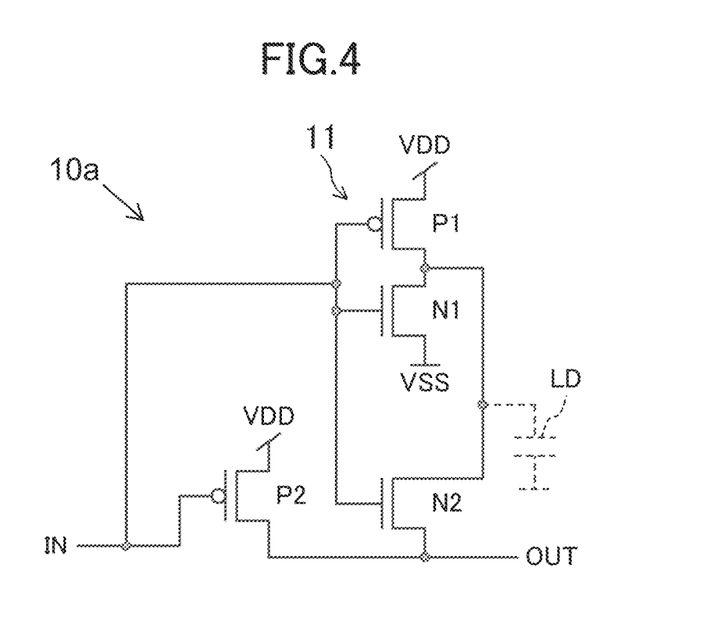
FIG. 4 shows an example of the circuit configuration of a delay circuit.

FIG. 4 shows a first example of the circuit configuration of the delay circuit. The delay circuit 10*a* shown in FIG. 4, which is an example of the delay circuit 10 shown in FIG. 3, includes p-type transistors P1 and P2 and n-type transistors N1 and N2. The delay circuit 10*a* shown in FIG. 4 can measure the delay characteristic of the transistor N1 that corresponds to an n-type transistor of the SRAM cell.

The transistors P1 and N1 are serially connected between VDD as the high-voltage side power supply and VSS as the low-voltage side power supply, and the gates of these transistors are mutually connected. That is, the transistors P1 and N1 constitute an inverter 11. The gates of the transistors P1 and N1 are connected to the input terminal IN. The transistors P1 and N1 respectively correspond to the transistors LD2 and DV2 of the SRAM cell 20 shown in FIG. 2. That is, the transistors P1 and N1 are respectively the same in size as the transistors LD2 and DV2.

The transistor P2 (that is a pull-up transistor) is connected to the input terminal IN at its gate, to VDD at its source, and to the output terminal OUT at its drain. When the input signal IN is low, the transistor P2 electrically connects VDD and the output terminal OUT.

The transistor N2 (that is a load-isolation transistor) is connected to the input terminal IN at its gate and to the output terminal OUT at its drain. The source of the transistor N2 is connected to the drains of the transistors P1 and N1, i.e., to the output of the inverter 11. When the input signal IN is low, the transistor N2 electrically isolates the output of the inverter 11 from the output terminal OUT.

A large load capacitance LD is provided at the output node of the inverter 11. The load capacitance LD is implemented by an interconnect, a capacitance, etc. so that its load be greater than a load capacitance connected to the output terminal OUT. For example, the load capacitance LD is implemented by a long interconnect, a dummy gate, etc.

The delay circuit 10 shown in FIG. 4 operates as follows. When the signal IN makes a low to high transition, the transistor N2 becomes on, electrically connecting the output of the inverter 11 with the output terminal OUT. At this time, the transistor P2 becomes off. Since the transistor N1 becomes on, the output signal OUT becomes low from high with a delay T_fN1. The delay T_fN1 is a delay at the time of fall of the output of the transistor N1.

When the signal IN makes a high to low transition, the transistor N2 becomes off, electrically isolating the output of the inverter 11 from the output terminal OUT. At this time, the transistor P2 becomes on, whereby the output signal OUT becomes high from low with a delay T_rP2. The delay T_rP2 is a delay at the time of rise of the output of the transistor P2.

The load capacitance LD is connected to the output terminal OUT when the signal IN makes a low to high transition, but is not connected to the output terminal OUT when the signal IN makes a high to low transition. Therefore, the delay T_fN1 and the delay T_rP2 have the following relationship.

$$T\_fN1 > T\_rP2.$$

When measuring the delay characteristic of the transistor N1, the ring oscillator 5 of FIG. 3 operates as follows. Here, assume that the delay circuit 10 shown in FIG. 3 is the delay circuit 10*a* shown in FIG. 4. The enable signal EN is made high. With the low to high transition of the input of the NAND circuit 15, the output of the NAND circuit 15 makes a high to low transition. The delay at this time is denoted by T_fNAND. In the first-stage delay circuit 10, with the high to low transition of the input IN, the output OUT makes a low to high transition with the delay T_rP2. In the second-stage delay circuit 10, with the low to high transition of the input IN, the output OUT makes a high to low transition with the delay T_fN1. Similar operations are performed in the delay circuits 10 at the third and subsequent stages. As the entire of the 2N delay circuits 10, therefore, the output signal OUT makes a high to low transition with a delay of N(T_fN1+T_rP2).

The above output signal is fed back to the NAND circuit 15, and the output of the NAND circuit 15 makes a low to high transition. The delay at this time is denoted by T_rNAND. In the first-stage delay circuit 10, with the low to high transition of the input IN, the output OUT makes a high to low transition with the delay T_fN1. In the second-stage delay circuit 10, with the high to low transition of the input IN, the output OUT makes a low to high transition with the delay T_rP2. Similar operations are performed in the delay circuits 10 at the third and subsequent stages. As the entire of the 2N delay circuits 10, therefore, the output signal OUT makes a low to high transition with the delay of N(T_fN1+T_rP2).

The operations described above constitute one cycle of the oscillating operation of the ring oscillator 5. Therefore, the period of the oscillating operation, T_cycle1, is expressed as follows.

$$T\_cycle1 = T\_fNAND + T\_rNAND + 2N(T\_fN1 + T\_rP2)$$

This indicates that, by increasing the load capacitance LD in FIG. 4, as well as increasing the value of N, the proportion of the delay T_fN1 in the period T_cycle1 of the oscillating operation can be increased. This can enhance the precision of the delay characteristic measurement of the transistor N1.

Second Example

Figure 5:
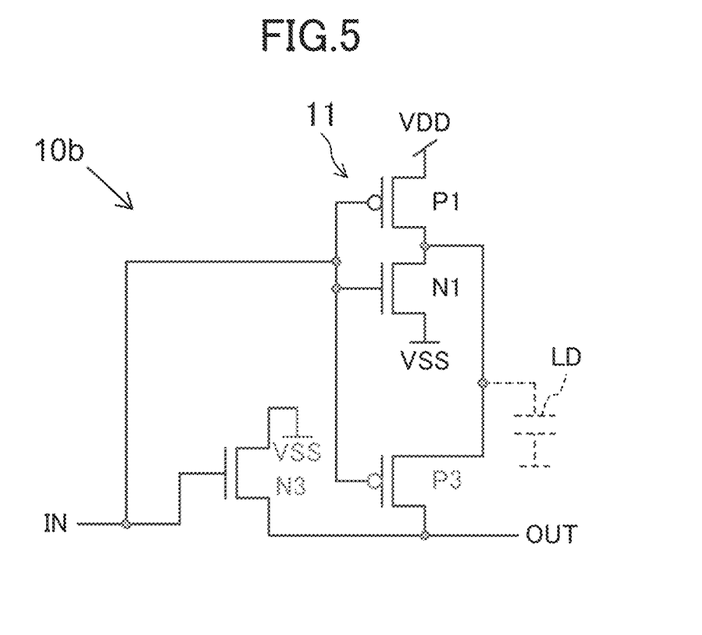
FIG. 5 shows another example of the circuit configuration of the delay circuit.

FIG. 5 shows a second example of the circuit configuration of the delay circuit. The delay circuit 10b shown in FIG. 5, which is an example of the delay circuit 10 shown in FIG. 3, includes p-type transistors P1 and P3 and n-type transistors N1 and N3. The delay circuit 10b shown in FIG. 5 can measure the delay characteristic of the transistor P1 that corresponds to a p-type transistor of the SRAM cell. Note that description of components in common with those in FIG. 4 may be omitted.

The transistor N3 (that is a pull-down transistor) is connected to the input terminal IN at its gate, to VSS at its source, and to the output terminal OUT at its drain. When the input signal IN is high, the transistor N3 electrically connects VSS and the output terminal OUT.

The transistor P3 (that is a load-isolation transistor) is connected to the input terminal IN at its gate and to the output terminal OUT at its drain. The source of the transistor P3 is connected to the drains of the transistors P1 and N1, i.e., to the output of the inverter 11. When the input signal IN is high, the transistor P3 electrically isolates the output of the inverter 11 from the output terminal OUT.

The delay circuit 10 shown in FIG. 5 operates as follows. When the signal IN makes a high to low transition, the transistor P3 becomes on, electrically connecting the output of the inverter 11 with the output terminal OUT. At this time, the transistor N3 becomes off. Since the transistor P1 becomes on, the output signal OUT becomes high from low with a delay T_rP1. The delay T_rP1 is a delay at the time of rise of the output of the transistor P1.

When the signal IN makes a low to high transition, the transistor P3 becomes off, electrically isolating the output of the inverter 11 from the output terminal OUT. At this time, the transistor N3 becomes on, whereby the output signal OUT becomes low from high with a delay T_fN3. The delay T_fN3 is a delay at the time of fall of the output of the transistor N3.

The load capacitance LD is connected to the output terminal OUT when the signal IN makes a high to low transition, but is not connected to the output terminal OUT when the signal IN makes a low to high transition. Therefore, the delay T_rP1 and the delay T_fN3 have the following relationship.

$$T\_rP1 > T\_fN3$$

When measuring the delay characteristic of the transistor P1, the ring oscillator 5 of FIG. 3 operates as follows. Here, assume that the delay circuit 10 shown in FIG. 3 is the delay circuit 10b shown in FIG. 5. The enable signal EN is made high. With the low to high transition of the input of the NAND circuit 15, the output of the NAND circuit 15 makes a high to low transition from with the delay T_fNAND. In the first-stage delay circuit 10, with the high to low transition of the input IN, the output OUT makes a low to high transition with the delay T_rP1. In the second-stage delay circuit 10, with the low to high transition of the input IN, the output OUT makes a high to low transition with the delay T_fN3. Similar operations are performed in the delay circuits 10 at the third and subsequent stages. As the entire of the 2N delay circuits 10, therefore, the output signal OUT makes a high to low transition with a delay of N(T_rP1+T_fN3).

The above output signal is fed back to the NAND circuit 15, and the output of the NAND circuit 15 makes a low to high transition with the delay T_rNAND. In the first-stage delay circuit 10, with the low to high transition of the input IN, the output OUT makes a high to low transition with the delay T_fN3. In the second-stage delay circuit 10, with the high to low transition of the input IN, the output OUT makes a low to high transition with the delay T_rP1. Similar operations are performed in the delay circuits 10 at the third and subsequent stages. As the entire of the 2N delay circuits 10, therefore, the output signal OUT makes a low to high transition with the delay of N(T_rP1+T_fN3).

The operations described above constitute one cycle of the oscillating operation of the ring oscillator 5. Therefore, the period of the oscillating operation, T_cycle2, is expressed as follows.

$$T\_cycle2 = T\_fNAND + T\_rNAND + 2N(T\_rP1 + T\_fN3)$$

This indicates that, by increasing the load capacitance LD in FIG. 5, as well as increasing the value of N, the proportion of the delay T_rP1 in the period T_cycle2 of the oscillating operation can be increased. This can increase the precision of the delay characteristic measurement of the transistor P1.

As described above, according to this embodiment, the semiconductor integrated circuit device 1 includes the ring oscillator 5 having a plurality of stages of delay circuits 10. In each of the delay circuits 10, when the signal sent to the input terminal IN makes a first transition, the signal at the output terminal OUT transitions in response to the operation of the first transistor (N1 in FIG. 4, P1 in FIG. 5) that corresponds to a transistor in the SRAM cell 20. Also, when the signal sent to the input terminal IN makes a second transition, at which the first transistor corresponding to the transistor in the SRAM cell 20 is electrically isolated from the output terminal OUT, the signal at the output terminal OUT transitions in response to the operation of the second transistor (P2 in FIG. 4, N3 in FIG. 5). Therefore, by increasing the load capacitance LD connected to the output of the first transistor, the proportion of the delay caused by the first transistor in the oscillation period of the ring oscillator 5 can be increased. This can enhance the precision of the delay characteristic of the first transistor.

OTHER EMBODIMENTS

<No. 1>

The first and second examples described above may be performed singly or in combination. That is, the semiconductor integrated circuit device according to the present disclosure may include both a first ring oscillator having the delay circuits in the first example and a second ring oscillator having the delay circuits in the second example.

<No. 2>

While the semiconductor integrated circuit device includes the SRAM circuit blocks in the above embodiment, the semiconductor integrated circuit device according to the present disclosure is not limited to this. For example, the semiconductor integrated circuit device according to the present disclosure may include a logic circuit, and a characteristic measurement circuit that evaluates the characteristics of a transistor corresponding to a transistor in the logic circuit may include a ring oscillator having the delay circuits described in the present disclosure.

According to the present disclosure, the precision of the delay characteristic measurement of an evaluation-target transistor can be enhanced. The present disclosure is therefore useful for improving the performance of an LSI, for example.

The invention claimed is:

1. A semiconductor integrated circuit device, comprising:
an SRAM circuit block including an SRAM cell; and
a ring oscillator having delay circuits arranged in a plurality of stages,
wherein
each of the delay circuits includes
an input terminal,
an output terminal,
a first transistor of a first conductivity type, the first transistor being a same in size as a transistor of the first conductivity type in the SRAM cell, and having a gate connected to the input terminal and a source connected to a first power supply,
a second transistor of a second conductivity type, having a gate connected to the input terminal, a source connected to a second power supply, and a drain connected to the output terminal, and
a third transistor of the first conductivity type, having a gate connected to the input terminal, a source connected to a drain of the first transistor, and a drain connected to the output terminal,
when a signal sent to the input terminal makes a first transition, the first and third transistors become conductive while the second transistor becomes nonconductive, and with the conduction of the third transistor, the drain of the first transistor is electrically connected to the output terminal, so that a signal at the output terminal transitions in response to an operation of the first transistor, and
when the signal sent to the input terminal makes a second transition opposite to the first transition, the first and third transistors become nonconductive while the second transistor becomes conductive, and with the nonconduction of the third transistor, the drain of the first transistor is electrically isolated from the output terminal, so that the signal at the output terminal transitions in response to an operation of the second transistor.

2. The semiconductor integrated circuit device of claim 1, wherein
the first conductivity type is an n-type and the second conductivity type is a p-type,
the first power supply is a low-voltage side power supply and the second power supply is a high-voltage side power supply, and
the first transition is a transition from a low level to a high level and the second transition is a transition from a high level to a low level.

3. The semiconductor integrated circuit device of claim 1, wherein
the first conductivity type is a p-type and the second conductivity type is an n-type,
the first power supply is a high-voltage side power supply and the second power supply is a low-voltage side power supply, and
the first transition is a transition from a high level to a low level and the second transition is a transition from a low level to a high level.

4. The semiconductor integrated circuit device of claim 1, wherein
the first transistor is the same in size as the transistor in the SRAM cell.

5. A semiconductor integrated circuit device, comprising:
a ring oscillator having delay circuits arranged in a plurality of stages,
wherein
each of the delay circuits includes
an input terminal,
an output terminal,
a first transistor of a first conductivity type, having a gate connected to the input terminal and a source connected to a first power supply,
a second transistor of a second conductivity type, having a gate connected to the input terminal, a source connected to a second power supply, and a drain connected to the output terminal, and
a third transistor of the first conductivity type, having a gate connected to the input terminal, a source connected to a drain of the first transistor, and a drain connected to the output terminal,
when a signal sent to the input terminal makes a first transition, the first and third transistors become conductive while the second transistor becomes nonconductive, and with the conduction of the third transistor, the drain of the first transistor is electrically connected to the output terminal, so that a signal at the output terminal transitions in response to an operation of the first transistor, and
when the signal sent to the input terminal makes a second transition opposite to the first transition, the first and third transistors become nonconductive while the second transistor becomes conductive, and with the nonconduction of the third transistor, the drain of the first transistor is electrically isolated from the output terminal, so that the signal at the output terminal transitions in response to an operation of the second transistor.

6. The semiconductor integrated circuit device of claim 5, wherein
the first conductivity type is an n-type and the second conductivity type is a p-type,
the first power supply is a low-voltage side power supply and the second power supply is a high-voltage side power supply, and
the first transition is a transition from a low level to a high level and the second transition is a transition from a high level to a low level.

7. The semiconductor integrated circuit device of claim 5, wherein
the first conductivity type is a p-type and the second conductivity type is an n-type,
the first power supply is a high-voltage side power supply and the second power supply is a low-voltage side power supply, and
the first transition is a transition from a high level to a low level and the second transition is a transition from a low level to a high level.

8. A semiconductor integrated circuit device, comprising:
a first ring oscillator having first delay circuits arranged in a plurality of stages; and a second ring oscillator having second delay circuits arranged in a plurality of stages,
wherein
each of the first delay circuits includes
a first input terminal,
a first output terminal,
a first transistor of a first conductivity type, having a gate connected to the first input terminal and a source connected to a first power supply,
a second transistor of a second conductivity type, having a gate connected to the first input terminal, a source connected to a second power supply, and a drain connected to the first output terminal, and
a third transistor of the first conductivity type, having a gate connected to the first input terminal, a source connected to a drain of the first transistor, and a drain connected to the first output terminal,
when a signal sent to the first input terminal makes a first transition, the first and third transistors become conductive while the second transistor becomes nonconductive, and with the conduction of the third transistor, the drain of the first transistor is electrically connected to the first output terminal, so that a signal at the first output terminal transitions in response to an operation of the first transistor,
when the signal sent to the first input terminal makes a second transition opposite to the first transition, the first and third transistors become nonconductive while the second transistor becomes conductive, and with the non-conduction of the third transistor, the drain of the first transistor is electrically isolated from the first output terminal, so that the signal at the first output terminal transitions in response to an operation of the second transistor, each of the second delay circuits includes
a second input terminal,
a second output terminal,
a fourth transistor of the second conductivity type, having a gate connected to the second input terminal and a source connected to the second power supply,
a fifth transistor of the first conductivity type, having a gate connected to the second input terminal, a source connected to the first power supply, and a drain connected to the second output terminal, and
a sixth transistor of the second conductivity type, having a gate connected to the second input terminal, a source connected to a drain of the fourth transistor, and a drain connected to the second output terminal,
when a signal sent to the second input terminal makes the second transition, the fourth and sixth transistors become conductive while the fifth transistor becomes nonconductive, and with the conduction of the sixth transistor, the drain of the fourth transistor is electrically connected to the second output terminal, so that a signal at the second output terminal transitions in response to an operation of the fourth transistor, and
when the signal sent to the second input terminal makes the first transition, the fourth and sixth transistors become nonconductive while the fifth transistor becomes conductive, and with the non-conduction of the sixth transistor, the drain of the fourth transistor is electrically isolated from the second output terminal, so that the signal at the second output terminal transitions in response to an operation of the fifth transistor.

* * * * *